Dec. 8, 1942.   A. GUDHEIM   2,304,452
BLENDING EDIBLE FATS
Filed Sept. 18, 1939
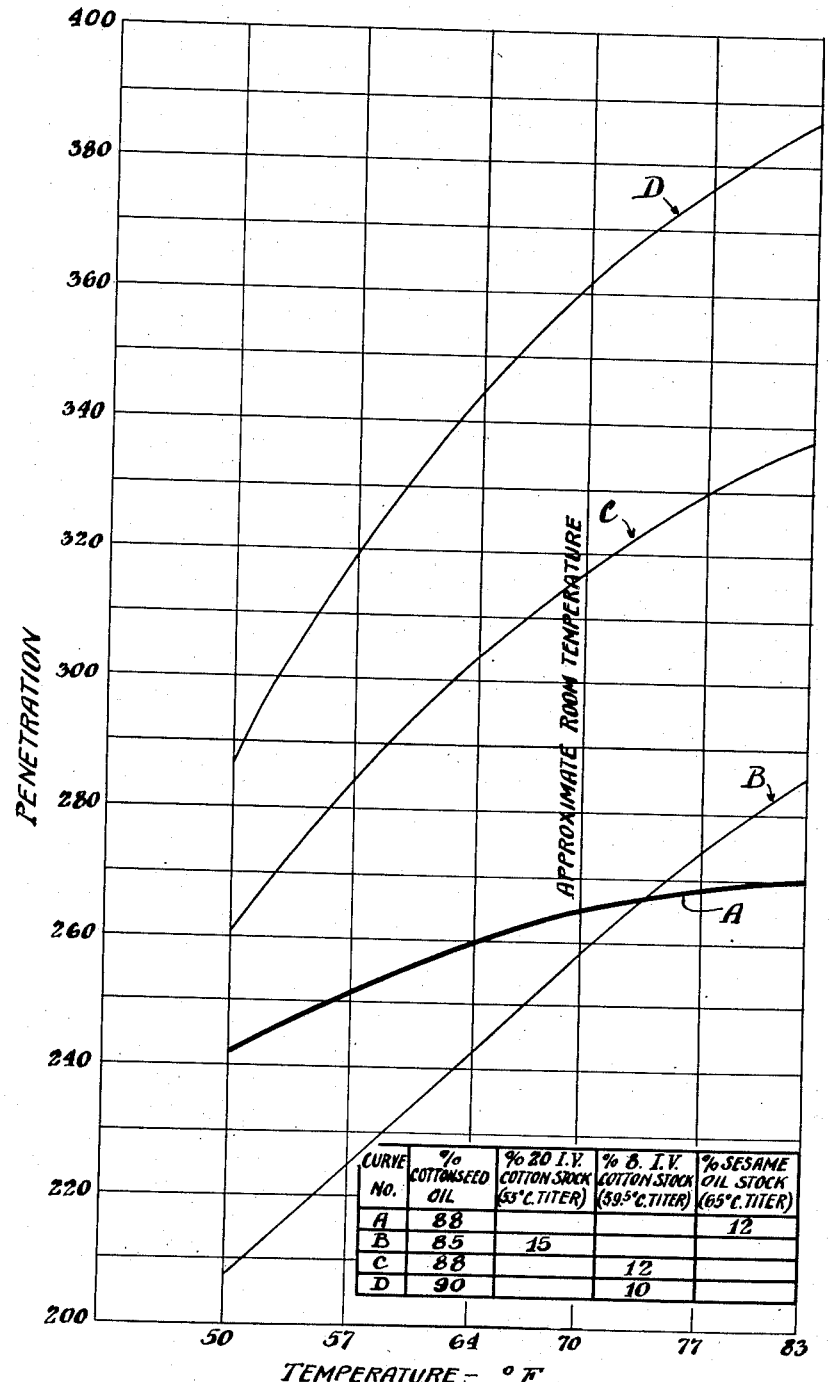
INVENTOR
Arne Gudheim
BY
Hoguet, Neary & Campbell
his ATTORNEYS Patented Dec. 8, 1942

2,304,452

UNITED STATES PATENT OFFICE 2,304,452

BLENDING EDIBLE FATS

Arne Gudheim, Leonia, N. J., assignor to Lever Brothers Company, a corporation of Maine Application September 18, 1939, Serial No. 295,355

5 Claims. (Cl. 99—122)

This invention relates to a plastic edible shortening and the method of manufacturing the same.

More particularly, the invention relates to a plastic shortening of the so-called "compound" type which possesses not only the desired consistency or hardness at room temperature, but also retains a suitable consistency at temperatures considerably below and above room temperature.

It is an object of my invention to produce a plastic edible shortening of the type referred to having a wider temperature range through which the shortening is plastic than is possessed by shortenings of this type heretofore available. For convenience, I refer to this property as a wide plastic range.

In the manufacture of shortenings of the type to which my invention relates, it is customary to refine edible oils, such as naturally occurring vegetable oils, and without hardening the same, mix or blend the oils in their liquid state with a fat or fats to yield a final semi-solid product having the desired characteristics. In the usual commercial process the so-called compound type of shortening is made from an edible unhydrogenated liquid oil blended with a sufficient portion of a normally solid fat, usually obtained by hydrogenating an oil, to give a final semi-solid product of the desired plasticity at room temperature. The blending operation is usually carried out at an elevated temperature at which the normally solid fat melts and becomes liquid. The liquid mixture is then chilled to a semi-solid plastic state and air or an inert gas is beaten into the plastic shortening giving it a white appearance and a "creamy" smooth texture.

For example, in accordance with a preferred form of the prior art, 85% of unhydrogenated cottonseed oil is blended with 15% of cottonseed oil hydrogenated to an iodine value of about 20, and a titer of about 55° C. The final product is semi-solid.

In order to better understand the significance of the plasticity or consistency of a shortening it is well to consider the effect of shortening in a baked product. The action of shortening is primarily physical, rather than chemical; therefore its physical properties are particularly important.

The flour used in baked products is composed primarily of starch and protein. The starch, which comprises about 70–75% of the flour, exists in the form of granules which remain as separate particles throughout the process of mixing and baking. The proteins are principally glutenin and gliadin, both of which absorb water.

The gliadin forms a glue-like mass with water which comes in contact with the firmer particles of glutenin during the mixing and forms the gluten of the dough. The gluten exists as strands and layers throughout the dough mass and as the mixing is continued the strands of gluten come in contact with each other and stick together. In this way the gluten develops and becomes stronger and more coherent. The network of gluten forms the skeleton of dough and in this network the starch granules are held. If such a dough were baked without shortening, a hard, strong, product would be produced which could not be easily broken or crushed.

From this consideration, the fundamental action of shortening can be more easily understood. On mixing a shortening of proper consistency with the dough, the shortening becomes mingled very intimately with other ingredients although it remains distinct and does not dissolve. During the mixing the shortening spreads and coats fresh surfaces in the dough with the result that when a fiber of gluten tends to come in contact with another fiber of gluten, the intermediate film of shortening prevents these two fibers from cohering as intimately as they otherwise would. In a like manner the shortening also penetrates between the starch granules. The shortening, therefore, breaks up what otherwise would be a continuous mass in the dough and performs the function of a separator or lubricant for the constituents of the dough. As a result, the various flour particles which are covered with the shortening do not adhere tenaciously to each other at their points of contact because of the shortening, and hence the product tends to crumble or break and in this condition it is known as being "tender" or "short."

It is well known that some shortenings have a much greater "shortening power" per pound than others. This is due to a number of features, some of which are not fully understood inasmuch as dough is a very complex mixture of colloids partially in colloidal solution and partially in suspension, and the introduction of a shortening into dough brings about complicated changes in the structure.

One of the most important properties of a shortening that contributes to its shortening power is its plasticity, smoothness and fineness throughout the mixing. If the shortening is liquid or too soft it may be absorbed to a considerable extent by the starch granules and as a result the dough will be "soggy"; or it may separate from the dough and collect in small, isolated pools with the result that the distribution of the shortening throughout the dough will not be uniform. A shortening also should not be too hard or non-plastic because if it is it will not coat or completely envelope each of the starch granules and spread uniformly and intimately throughout the dough mass. A shortening which is too hard or non-plastic will not cover as great an area in the dough as a more plastic shortening and will not properly fill the cracks, pores and spaces in the dough.

It will be seen, therefore, that a shortening which remains plastic throughout the mixing will have a much greater "shortening power" than one which is either too solid or too liquid.

It is desirable in manufacturing shortening to form a product having the desired consistency and hardness at room temperature.

It is also desirable that the shortening should retain its plastic or hard characteristics at relatively high temperatures, for example, it is not unusual, particularly in the summer season and in hot kitchens, for shortening to be subjected to temperatures as high as 85 to 90° F. or higher. If the shortening becomes soft and oily at such relatively high temperatures, the liquid constituents and the occluded gas will be released, thereby adversely affecting the culinary properties of the shortening as well as its appearance.

Similarly, the shortenings are often kept or stored in refrigerators or otherwise subjected to low temperatures. If the shortening is not reasonably plastic at these temperatures, it will be difficult to mix with the other ingredients in the making of a culinary product. In order to avoid this difficulty it is often heated to excess which deleteriously affects its culinary properties.

In the compound type of shortening, the solid fat forms a matrix or crystalline structure throughout which the liquid and the softer portions are uniformly and finely distributed. This gives the shortening the appearance of a uniform continuous mass. The liquid oils, when distributed in this condition, impart the necessary plasticity to the shortening but are, nevertheless, so held in the matrix that they are not available in a free form to deleteriously affect the culinary properties of the shortening.

The liquid oil in the shortening is actually a mixture of compounds solidifying at different temperatures, and similarly the solid fat is a mixture of compounds melting at different temperatures. Therefore, as the temperature of a shortening is raised or lowered the ratio of solid to liquid constituents changes. Consequently, the plasticity of the shortening is normally dependent to some extent upon its temperature. In accordance with my invention the plasticity is not so much a function of temperature, due to the selection and proportioning of certain critical ingredients.

I have discovered that in compounding a shortening, if a harder fat than that employed heretofore is used in an amount to produce the desired hardness at room temperature, for example a fat having a titer of substantially 65° C. or above, the hardness of the shortening at elevated temperatures is materially increased as compared with shortenings made in accordance with the prior practice; on the other hand, the hardness of the shortening at lower temperatures also is decreased. In other words, the plastic range of the shortening is extended beyond that heretofore known.

Hard fats having a titer of substantially 65° C. or above, may be conveniently prepared by fully hydrogenating suitable vegetable oils. When the oil is fully hydrogenated, the degree of unsaturation is relatively very low, as is revealed by its iodine value. For example, soya bean oil hydrogenated to an iodine value of about 5 has a titer of 65° C., and at an iodine value of about 1.0 it has a titer of about 66.2° C. Sunflower oil, hydrogenated to an iodine value of about 1.0, has a titer of about 65° C. Sesame oil, hydrogenated to an iodine value of 1 has a titer of 66.5° C.

Not all oils may be hydrogenated to a titer of 65° C. and some oils cannot be hydrogenated to a titer of 60° C. Cottonseed oil, hydrogenated to an iodine value of 1.0, has a titer of about 62° C. and cannot be hydrogenated to a titer higher than about 63° C.

Suitable hard fats, if they occur in nature, may also be used, or they may be prepared synthetically.

In general, the iodine value of the hard fat I employ is below 5. While this is preferable, it is not necessary because the iodine value is not critical as long as the titer is 65° C. or above. For example, linseed oil, when hydrogenated to an iodine value about 10, will have a titer of 65° C.

In determining the plasticity or consistency of a fat at room temperature or any other higher or lower temperature, a penetration test is employed which indicates in arbitrary values the extent to which a plunger needle of definite dimensions and weight will penetrate the fat under given conditions.

The meaning of the term penetration as used herein is similar to the meaning of this term as commonly employed in the commercial examination of plastic bituminous materials. The term penetration as relating to bituminous materials is defined in the fourth edition of "Standard Methods of Chemical Analysis" by Scott as follows: "Penetration is defined as the consistency of a bituminous material expressed as the distance that a standard needle vertically penetrates a sample of the material under known conditions of loading, time and temperature." The size of the needle, the conditions of loading, time and temperature employed in a shortening test are arbitrarily determined and are constant for all tests.

The amount of hard fat that is employed will depend upon the desired plastic characteristics and hardness of the shortening at room temperature. The latter may be determined somewhat by climatic conditions as well as by the culinary uses to which the shortening is to be put. It will also depend upon the characteristics of the softer and liquid constituents.

Shortenings of the compound type, suitable for the majority of culinary operations, should have a plasticity at room temperature (70° F.) of about 230 to 280. For some particular purposes these shortenings may have penetrations as low as 200 and as high as 300. The desired penetration at room temperature will be obtained by adjusting the proportions of the oil and the hard fat having a titer of 65° C. or above.

The amount of hard fat will usually be of the order of 5 to 20% and preferably about 9 to 15%. My invention, however, includes products having smaller and higher percentages of hard fat, which may be used in the preparation of shortenings for special culinary purposes. But irrespective of the portions or the plasticity at room temperature, the wider plastic range will be manifest.

My invention and the manner in which it distinguishes from the prior art, will be understood from the drawing forming a part of the application and in which the single figure illustrates graphically the penetrations of different shortenings at different temperatures.

As illustrative of the prior art, the penetration values of shortening prepared from 85% refined cottonseed oil blended with 15% cotton stock obtained by partially hydrogenating cottonseed oil to an iodine value of 20, are shown by line B in the drawing. Such stock has a titer of about 55° C. This shortening has a penetration at room temperature of about 260. The penetrations of this shortening at 50° F. and 83° F. are about 206 and 286, respectively, or a difference of 80 points penetration over the temperature range noted.

As illustrative of my invention, a shortening is prepared from about 88% of the same cottonseed oil as is used in the previous example, blended with about 12% of a hard fat having a titer of 65° C. obtained by hydrogenating sesame oil to this titer. This product possesses the penetration values illustrated by line A in the drawing. This shortening has about the same penetration at room temperature (about 265) as that prepared with 15% of the 20 I. V. stock in the previous example, but it has penetrations of about 242 and 270 at the same lower and upper temperatures, respectively, or a difference of only 28 points penetration over the temperature range.

It will be noted that the shortening made with the 65° C. titer hard fat is much more penetrable at the lower temperatures and much less penetrable at the higher temperatures than a shortening prepared by using the 55° C. titer fat. The plastic characteristics so essential in shortenings are, therefore, retained to a much greater extent over a wide temperature range.

The unobvious advantages of my invention may be demonstrated in a further consideration of the prior art, where it has been alleged that in the event that a harder hydrogenized stock is used, its proportion may be correspondingly reduced. I have not found this to be the fact. For example, if a shortening is prepared from 90% cottonseed oil admixed with 10% of cotton stock hydrogenated to an iodine value of 8 (and having a titer of 59½° C.) such a shortening has a penetration at room temperature of about 362 and is entirely too soft for the use to which shortenings are primarily adaptable. The plasticity at temperatures of 50° and 83° F. respectively are 286 and 386 or a difference of 100 points penetration over the temperature range under consideration. This is illustrated by line D in the drawing.

When employing cotton stock having an iodine value of 8, the amount cannot be reduced appreciably below the amount required of a 20 I. V. stock. For example, a shortening containing 88% cottonseed oil and 12% cotton stock having an iodine value of 8, has a penetration at room temperature of about 318, which is also too high for most uses. This is shown by line C in the drawing. It is necessary to employ between 14 and 15% of the 8 I. V. stock in order to obtain a penetration at room temperature comparable to that obtained with 15% with the 20 I. V. stock. It is apparent, therefore, that when using stock of relatively low titer, that is, of the order of 55° to 60° C., it is not possible to use a lesser amount of a harder stock.

It is apparent from a description of my invention, however, that when employing stocks having a titer of 65° C. or above, such is not the case, since in accordance with my invention it is necessary to use only 12% of the 65° C. titer stock to obtain a shortening having approximately the same penetration at room temperature as that obtained by a shortening containing 15% of a 55° C. titer stock. Apparently the stock having a titer of 65° C. has properties that are unique in so far as it affects the plasticity of the shortening, and has properties that are entirely different than that possessed by stocks of the titer heretofore proposed.

In order to better understand and appreciate the plasticity advantages to be gained by employing a hard fat having a high titer in admixture with the liquid oleaginous materials and to interpret the penetration in terms that are more commonly understood, the penetration figures obtained on commercial samples of butter and lard at 50° F., 70° F., and 83° F. are shown below:

| Sample | 50° F. | 70° F. | 83° F. |
|---|---|---|---|
| Butter | 130–140 | 275–285 | Higher than 500. |
| Lard | 175–185 | 245–255 | Higher than 500. |

These results were obtained in the same manner as were the figures on the samples which are referred to above.

As has been pointed out heretofore, satisfactory culinary results can be secured from a shortening only when it has the proper plasticity at the temperature at which it is being used. As has been shown, compound shortenings formed with the hard fats of 65° C. titer or above are plastic over a wider temperature range than those heretofore known to the art. As a consequence better culinary results can be obtained over a much wider temperature range using shortenings containing hard fats of 65° C. titer or above than can be obtained with those compounded with hard fats of a lower titer as previously known in the art.

I wish it to be understood that I do not desire to be limited to the exact details disclosed, because obvious modifications will occur to a person skilled in the art.

This application is a continuation-in-part of my application Serial Number 171,909, filed October 30, 1917, to which has been assigned Pat No. 2,174,365.

I claim:

1. A plastic shortening having a uniform appearance and texture, in which the shortening ingredients consist essentially of 80 to 95% of an adible liquid vegetable oil and 5 to 20% of a hard fat having a titer of not less than 65° C., whereby the mixture has a plasticity at room temperature suiting it to culinary operations and retains its plasticity over a wide temperature range.

2. A plastic shortening having uniform appearance and texture, in which the shortening ingredients consist essentially of 85 to 90% of an edible liquid vegetable oil and 10 to 15% of a hard fat having a titer of not less than 65° C., whereby the mixture has a plasticity at room temperature suiting it for culinary operations and retains its plasticity over a wide temperature range.

3. A plastic shortening product having a uniform appearance and texture, and having a plasticity at room temperature suiting it for culinary operations, which plasticity is retained over a wide temperature range, in which product the shortening ingredients consist essentially of 83 to 93% of an edible liquid vegetable oil and 7 to 17% of a hard fat having a titer of not less than 65° C., said hard fat being prepared by hydrogenating a vegetable oil which, when substantially completely hydrogenated, has a titer of not less than 65° C.

4. A plastic shortening product having a uniform appearance and texture, and having a plasticity at room temperature suiting it for culinary operations, which plasticity is retained over a wide temperature range, in which product the shortening ingredients consist essentially of 85 to 90% of an edible liquid vegetable oil and 10 to 15% of a hard fat having a titer of not less than 65° C., said hard fat being prepared by hydrogenating a vegetable oil which, when substantially completely hydrogenated, has a titer of not less than 65° C.

5. A plastic shortening product in which the shortening ingredients consist essentially of about 88% of a liquid vegetable oil and about 12% of a hard fat having a titer of not less than 65° C.

ARNE GUDHEIM.